United States Patent
Hasegawa et al.

(10) Patent No.: US 9,298,049 B2
(45) Date of Patent: *Mar. 29, 2016

(54) LIQUID CRYSTAL DISPLAY DEVICE

(71) Applicant: Japan Display Inc., Minato-ku (JP)

(72) Inventors: Hitomi Hasegawa, Minato-ku (JP); Jin Hirosawa, Minato-ku (JP); Arihiro Takeda, Minato-ku (JP); Nobuko Fukuoka, Minato-ku (JP); Yusuke Morita, Minato-ku (JP)

(73) Assignee: JAPAN DISPLAY INC., Minato-ku (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/693,243

(22) Filed: Apr. 22, 2015

(65) Prior Publication Data
US 2015/0227009 A1    Aug. 13, 2015

Related U.S. Application Data

(62) Division of application No. 13/449,871, filed on Apr. 18, 2012, now Pat. No. 9,052,552.

(30) Foreign Application Priority Data

Apr. 22, 2011  (JP) .................. 2011-096508

(51) Int. Cl.
*G02F 1/1343* (2006.01)
*G02F 1/1337* (2006.01)

(52) U.S. Cl.
CPC ........ *G02F 1/134336* (2013.01); *G02F 1/1337* (2013.01); *G02F 1/134309* (2013.01);
(Continued)

(58) Field of Classification Search
CPC ........ G02F 2001/134372; G02F 2001/134381; G02F 2001/134318; G02F 1/134363; G02F 1/134309
See application file for complete search history.

(56) References Cited

U.S. PATENT DOCUMENTS 6,266,116 B1    7/2001  Ohta et al.
8,368,861 B2    2/2013  Niioka et al.
(Continued)

FOREIGN PATENT DOCUMENTS

JP    6-222397    8/1994
JP    7-159807    6/1995
(Continued)

OTHER PUBLICATIONS

Office Action issued Sep. 3, 2013, in Japanese Patent Application No. 2011-096508 (submitting English translation only).
(Continued)

*Primary Examiner* — Dennis Y Kim
(74) *Attorney, Agent, or Firm* — Oblon, McClelland, Maier & Neustadt, L.L.P.

(57) ABSTRACT

In one embodiment, a first substrate is provided with first and second main pixel electrodes electrically connected each other extending along a first direction, respectively. A second substrate includes first to third main common electrodes electrically connected each other extending along the first direction, respectively. The first main pixel electrode is arranged between the first and second main common electrodes, and the second main pixel electrode is arranged between the second and third main common electrodes. Four inter-electrode distances are formed. One of the four inter-electrode distances is set to an optimal inter-electrode distance, and one of the four inter-electrode distances is different from at least one of the other three inter-electrode distances. Herein, the optimal inter-electrode distance is defined as follows: in a range of voltage which is applied between the electrodes, more than 90% of a peak transmissivity is obtained by the optimal inter-electrode distance.

4 Claims, 16 Drawing Sheets

(52) U.S. Cl.
CPC ............ *G02F1/134363* (2013.01); *G02F 2001/133749* (2013.01); *G02F 2001/134318* (2013.01); *G02F 2001/134372* (2013.01); *G02F 2001/134381* (2013.01)

(56) References Cited

U.S. PATENT DOCUMENTS

| | | | |
|---|---|---|---|
| 9,052,552 B2* | 6/2015 | Hasegawa | G02F 1/134309 |
| 2001/0010575 A1* | 8/2001 | Yoshida | G02F 1/134363 349/141 |
| 2004/0165136 A1 | 8/2004 | Sugiyama et al. | |
| 2005/0206824 A1 | 9/2005 | Son et al. | |
| 2005/0219453 A1 | 10/2005 | Kubo et al. | |
| 2007/0115234 A1 | 5/2007 | Kim et al. | |
| 2008/0062358 A1 | 3/2008 | Lee et al. | |
| 2008/0180590 A1 | 7/2008 | Lee et al. | |
| 2008/0180623 A1 | 7/2008 | Lee et al. | |
| 2008/0186439 A1 | 8/2008 | Kwon et al. | |
| 2009/0207363 A1 | 8/2009 | Hirosawa | |
| 2011/0234947 A1 | 9/2011 | Hirosawa | |

FOREIGN PATENT DOCUMENTS

| | | |
|---|---|---|
| JP | 9-105908 A | 4/1997 |
| JP | 9-160041 | 6/1997 |
| JP | 9-160041 A | 6/1997 |
| JP | 9-160042 | 6/1997 |
| JP | 9-160061 | 6/1997 |
| JP | 9-258269 A | 10/1997 |
| JP | 10-26765 | 1/1998 |
| JP | 10-90708 | 4/1998 |
| JP | 2000-81641 A | 3/2000 |
| JP | 2003-57670 A | 2/2003 |
| JP | 2005-3802 | 1/2005 |
| JP | 3644653 | 2/2005 |
| JP | 2005-242307 | 9/2005 |

OTHER PUBLICATIONS

Nakayoshi et al., Liquid Crystal Display Device, Machine Translation of JP 2003-057670 A from JPO AIPN website, All pages.

* cited by examiner

LIQUID CRYSTAL DISPLAY DEVICE

CROSS-REFERENCE TO RELATED APPLICATION

This application is a divisional of U.S. application Ser. No. 13/449,871 filed Apr. 18, 2012, and is based upon and claims the benefit of priority from prior Japanese Patent Application No. 2011-096508, filed Apr. 22, 2011, the entire contents of each of which are incorporated herein by reference.

FIELD

Embodiments described herein relate generally to a liquid crystal display device.

BACKGROUND

In recent years, a flat panel display is developed briskly, and especially, the liquid crystal display device gets a lot of attention from advantages, such as light weight, thin shape, and low power consumption. Especially, in an active matrix type liquid crystal display device equipped with a switching element in each pixel, a structure using lateral electric field, such as IPS (In-Plane Switching) mode and FFS (Fringe Field Switching) mode, attracts attention. The liquid crystal display device using the lateral electric field mode is equipped with pixel electrodes and a common electrode formed in an array substrate, respectively. Liquid crystal molecules are switched by the lateral electric field substantially in parallel with the principal surface of the array substrate.

On the other hand, another technique is also proposed, in which the liquid crystal molecules are switched using the lateral electric field or an oblique electric field between the pixel electrode formed in the array substrate and the common electrode formed in a counter substrate.

BRIEF DESCRIPTION OF THE DRAWINGS

The accompanying drawings, which are incorporated in and constitute a portion of the specification, illustrate embodiments of the invention, and together with the general description given above and the detailed description of the embodiments given below, serve to explain the principles of the invention.

DETAILED DESCRIPTION

Figure 1:
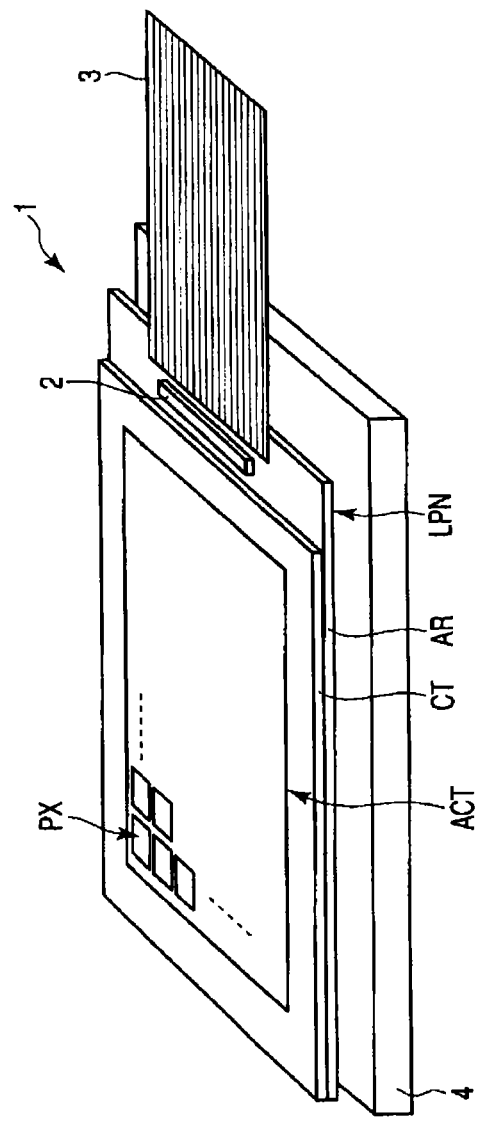
FIG. 1 is a figure schematically showing a structure of a liquid crystal display device according to one embodiment.

A liquid crystal display device according to an exemplary embodiment of the present invention will now be described with reference to the accompanying drawings wherein the same or like reference numerals designate the same or corresponding portions throughout the several views.

According to this embodiment, a liquid crystal display device includes: a first substrate including a first main pixel electrode and a second main pixel electrode electrically connected each other extending along a first direction, respectively, a second substrate including a first main common electrode, a second main common electrode, and a third main common electrode electrically connected each other extending along the first direction, respectively, and the first main pixel electrode being arranged between the first main common electrode and the second main common electrode so as to obliquely face the first and second main common electrodes, and the second main pixel electrode being arranged between the second main common electrode and the third main common electrode so as to obliquely face the second and third main common electrodes; and a liquid crystal layer having liquid crystal molecules and held between the first substrate and the second substrate; wherein among a first inter-electrode distance between the first main common electrode and the first main pixel electrode, a second inter-electrode distance between the second main common electrode and the first main pixel electrode, a third inter-electrode distance between the second main common electrode and the second main pixel electrode, and a fourth inter-electrode distance between the third main common electrode and the second main pixel electrodes in the second direction that intersects perpendicularly the first direction, respectively, one of the four inter-electrode distances is set to an optimal inter-electrode distance and one of the four inter-electrode distances is different from at least one of the other three inter-electrode distances. Herein, the optimal inter-electrode distance is defined as follows: in a range of voltage which can be applied between the main pixel electrodes and the main common electrodes, more than 90% of a peak transmissivity is obtained by the optimal inter-electrode distance.

FIG. 1 is a figure schematically showing the structure of the liquid crystal display device 1 according to an embodiment.

The liquid crystal display device 1 includes an active-matrix type liquid crystal display panel LPN, a driver IC chip 2 connected to the liquid crystal display panel LPN, a flexible wiring substrate 3, a backlight 4 for illuminating the liquid crystal display panel LPN, etc.

The liquid crystal display panel LPN is equipped with an array substrate AR as a first substrate, a counter substrates CT as a second substrate arranged opposing the array substrate AR, and a liquid crystal layer (not shown) held between the array substrate AR and the counter substrates CT. The liquid crystal display panel LPN includes an active area ACT which displays images. The active area ACT is constituted by a plurality of pixels PX arranged in the shape of a (m×n) matrix (here, "m" and "n" are positive integers).

The backlight 4 is arranged on the back side of an array substrate AR in the illustrated example. Various types of backlights can be used as the backlight 4. For example, a light emitting diode (LED) or a cold cathode fluorescent lamp (CCFL), etc., can be applied as a light source of the backlight 4, and the explanation about its detailed structure is omitted.

Figure 2:
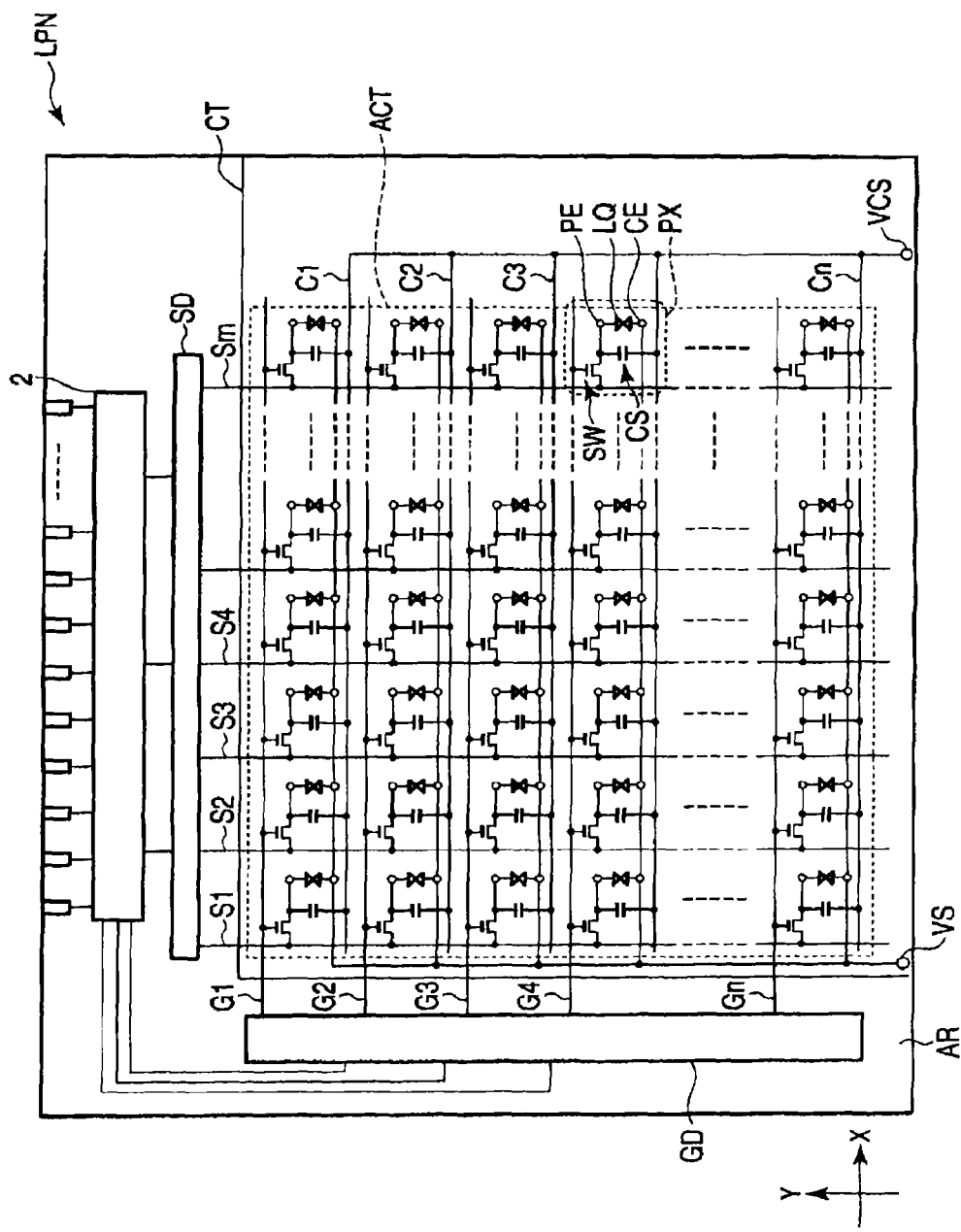
FIG. 2 is a figure schematically showing the structure and the equivalent circuit of a liquid crystal display panel shown in FIG. 1.

FIG. 2 is a figure schematically showing a structure and an equivalent circuit of the liquid crystal display panel LPN shown in FIG. 1.

The liquid crystal display panel LPN is equipped with "n" gate lines G (G1-Gn), "n" auxiliary capacitance lines C (C1-Cn), "m" source lines S (S1-Sm), etc., in the active area ACT. The gate line G and the auxiliary capacitance line C are arranged in parallel each other in a first direction Y that intersects perpendicularly a second direction X. However, they do not necessarily extend linearly. The source lines S extend in the first direction Y that intersects the gate line G and the auxiliary capacitance line C in parallel. Though the source lines S extend in the first direction Y, respectively, they do not necessarily extend linearly. The gate line G, the auxiliary capacitance line C and the source lines S may be crooked partially.

Each gate line G is pulled out to the outside of the active area ACT, and is connected to a gate driver GD. Each source line S is pulled out to the outside of the active area ACT, and is connected to a source driver SD. At least a portion of the gate driver GD and the source driver SD is formed in the array substrate AR, for example, and the gate driver GD and the source driver SD are connected with the driver IC chip 2 provided in the array substrate AR and having an implemented controller.

Each pixel PX includes a switching element SW, a pixel electrode PE, a common electrode CE, etc. Retention capacitance Cs is formed, for example, between the auxiliary capacitance line C and the pixel electrode PE.

In addition, in the liquid crystal display panel LPN according to this embodiment, while the pixel electrode PE is formed in the array substrate AR, the common electrode CE is formed in the counter substrate CT. Liquid crystal molecules of a liquid crystal layer LQ are switched mainly using an electric field formed between the pixel electrodes PE and the common electrodes CE. The electric field formed between the pixel electrode PE and the common electrode CE is a lateral electric field substantially in parallel with the principal surface of the array substrate AR or the principal surface of the counter substrate CT, or an oblique electric field slightly oblique with respect to the principle surfaces of the substrates.

The switching element SW is constituted by n channel type thin film transistor (TFT), for example. The switching element SW is electrically connected with the gate line G and the source line S. The (m×n) switching elements SW are formed in the active area ACT.

The pixel electrode PE is electrically connected with the switching element SW. The (m×n) pixel electrodes PE are formed in the active area ACT. The common electrode CE is set to a common potential, for example. The common electrode CE is arranged in common to the plurality of pixel electrodes PE through the liquid crystal layer LQ. The auxiliary capacitance line C is electrically connected with a voltage impressing portion VCS to which the auxiliary capacitance voltage is impressed.

The array substrate AR includes an electric power supply portion VS formed outside of the active area ACT. Furthermore, the common electrode CE formed on the counter substrate CT is electrically connected with the electric power supply portion VS formed in the array substrate AR through an electric conductive component which is not illustrated.

Figure 3:
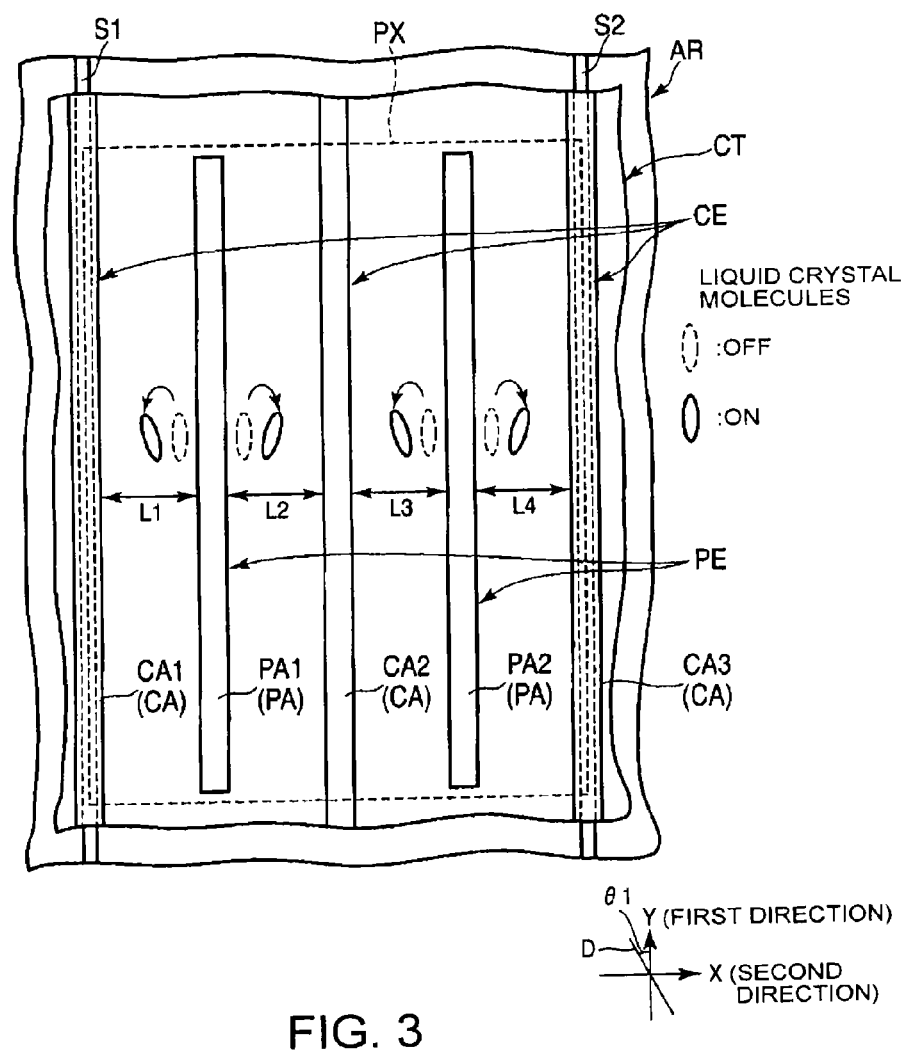
FIG. 3 is a plan view schematically showing a basic structure of a pixel in the liquid crystal display panel according to the embodiment.

FIG. 3 is a plan view schematically showing a basic structure of a pixel PX according to this embodiment.

The array substrate AR is equipped with the pixel electrode PE. The pixel electrode PE is arranged between a source line S1 and a source line S2 in the array substrate AR. The pixel electrode PE includes a plurality of main pixel electrodes PA. In the illustrated example, the pixel electrode PE has a first main pixel electrode PA1 and a second main pixel electrode PA2 as the main pixel electrode PA. The first main pixel electrode PA1 and the second main pixel electrode PA2 are electrically mutually connected through a capacitance portion or a sub-pixel electrode, etc., which extends along the second direction X, although not explained in detail. In this embodiment, the all pixel electrodes PE are formed on the array substrate, and are electrically connected with the switching element (not shown) in the capacitance portion facing the auxiliary capacitance line, which is not illustrated. The capacitance portion is arranged in an upper portion end or an approximately central portion of the pixel PX.

The first main pixel electrode PA1 and the second main pixel electrode PA2 extend along the first direction Y, respectively, and are arranged along the second direction X, with an inter-electrode distance therebetween. In the illustrated example, the first main pixel electrode PA1 is arranged at the left-hand side rather than the approximately central portion of the pixel in the figure. The second main pixel electrode PA2 is arranged at the right-hand side in the figure rather than the approximately central portion of the pixel in the figure. The first main pixel electrode PA1 and the second main pixel electrode PA2 are formed in the shape of a belt which extends linearly from the upper portion end to a bottom end portion of the pixel PX along the first direction Y, respectively, and are arranged substantially in parallel each other.

The counter substrate CT is equipped with a common electrode CE. The common electrode CE includes a plurality of main common electrodes CA. In the illustrated example, the common electrode CE has a first main common electrode CA1, a second main common electrode CA2, and the third main common electrode CA3 as the main common electrode CA. The first main common electrode CA1, the second main common electrode CA2, and the third main common electrode CA3 are electrically connected each other, although not explained in detail. For example, the main common electrode CA are pulled out to the outside of an active area, and are electrically connected with the electric supply portion formed in the array substrate AR through an electric conduction component, and the common potential is applied. The common electrode CE is insulated electrically with the pixel electrode PE. The counter substrate CT is equipped with the common electrode CE in this embodiment. In addition, the array substrate AR may be equipped with a portion of the common electrodes CE.

The first main common electrode CA1, the second main common electrode CA2, and the third main common electrode CA3 extend along the first direction Y, respectively, and arranged along the second direction X with a predetermined inter-electrode distance. In the illustrated example, the second main common electrode CA2 is arranged approximately in the pixel central portion. The first main common electrode CA1 is arranged at the left-hand side end of the pixel PX adjacent to a next pixel (not shown), and moreover, is arranged striding over a boundary between the illustrated pixel PX and the next pixel of the left-hand side. The first main common electrode CA1 counters with the source wiring S1 arranged striding over a boundary between the illustrated pixel and the next pixel on the left-hand side. The third main common electrode CA3 is arranged at the right-hand side end of the pixel PX adjacent to a next pixel (not shown), and moreover, is arranged striding over a boundary between the illustrated pixel PX and the next pixel of the right-hand side. The third main common electrode CA3 counters with the source line S2 arranged striding over a boundary between the illustrated pixel and the next pixel on the right-hand side. The first main common electrode CA1, the second main common electrode CA2 and the third main common electrode CA3 linearly extend along the first direction Y, respectively in a belt-like shape and in parallel.

The main pixel electrode PA and the main common electrode CA are arranged by turns along the second direction X, substantially in parallel each other. At this time, in the X-Y plane, any of the main common electrodes CA overlap with the main pixel electrode PA, and the aperture which mainly contributes to a display is formed between each of the main common electrode CA and the main pixel electrode PA.

Between the first main common electrode CA1 and the adjoining second main common electrode CA2, one main pixel electrode PA1 is arranged. That is, the first main common electrode CA1 and the second main common electrode CA2 are arranged at the both sides which sandwich the first main pixel electrode PA1. The first main pixel electrode PA1 is arranged so as to obliquely face the first main common electrode CA1 and the second main common electrode CA2 each other between the first main common electrode CA1 and the second main common electrode CA2.

Moreover, between the second main common electrode CA2 and the adjoining third main common electrode CA3, a second main pixel electrode PA2 is arranged. That is, the second main common electrode CA2 and the third main common electrode CA3 are arranged at the both sides which sandwich the second main pixel electrode PA2. The second main pixel electrode PA2 is arranged so as to obliquely face the second main common electrode CA2 and the third main common electrode CA3 each other between the second main common electrode CM and the third main common electrode CA3.

Moreover, between adjoining first main pixel electrode PA1 and the second main pixel electrode PA2, the second main common electrode CA2 is arranged. That is, the first main pixel electrode PA1 and the second main pixel electrode PM are arranged at the both sides which sandwich the second main common electrode CA2. The second main pixel electrode PA2 is arranged so as to obliquely face the first main pixel electrode PA1 and the second main pixel electrode PM each other between the first main pixel electrode PA1 and the second main pixel electrode PA2.

Accordingly, the first main common electrode CA1, the first main pixel electrode PA1, the second main common electrode CA2, the second main pixel electrode PA2, and the third main common electrode CA3 are arranged along the second direction X in this order.

In this embodiment, apertures are formed in one pixel, between the first main common electrode CA1 and the first main pixel electrode PA1, between the first main pixel electrode PA1 and the second main common electrode CA2, between the second main common electrode CA2 and the second main pixel electrode PA2, and between the second main pixel electrode PA2 and the third main common electrode CA3. That is, in the example shown here, four apertures are formed in one pixel PX.

A first inter-electrode distance between the first main common electrode CA1 and first main pixel electrode PA1 is set to L1, a second inter-electrode distance between the first main pixel electrode PA1 and the second main common electrode CA2 is set to L2, a third inter-electrode distance between the second main common electrode CA2 and the second main pixel electrode PA2 is set to L3, and a fourth inter-electrode distance between the second main pixel electrode PA2 and the third main common electrode CA3 is set to L4. Herein, all of the first inter-electrode distance L1, the second inter-electrode distance L2, the third inter-electrode distance L3, and the fourth inter-electrode distance L4 are the lengths in the second direction X.

In this embodiment, an initial alignment direction of the liquid crystal molecule LM is substantially in parallel with the first direction Y, however, may be an oblique direction D crossing the first direction Y. Here, the angle θ1 between the first direction Y and the initial alignment direction D is set to an angle larger than 0° and smaller than 45°. From a viewpoint of alignment control of the liquid crystal molecules, it is extremely effective that the angle θ1 is set to a range of approximately 5° to 25°, and more preferably, around 10°. Here, the angle θ1 is a slightly oblique direction by about several degrees, for example, 7°, with respect to the first direction Y.

Moreover, the common electrode CE may be further equipped with sub-common electrodes which extend along the second direction X.

Figure 4:
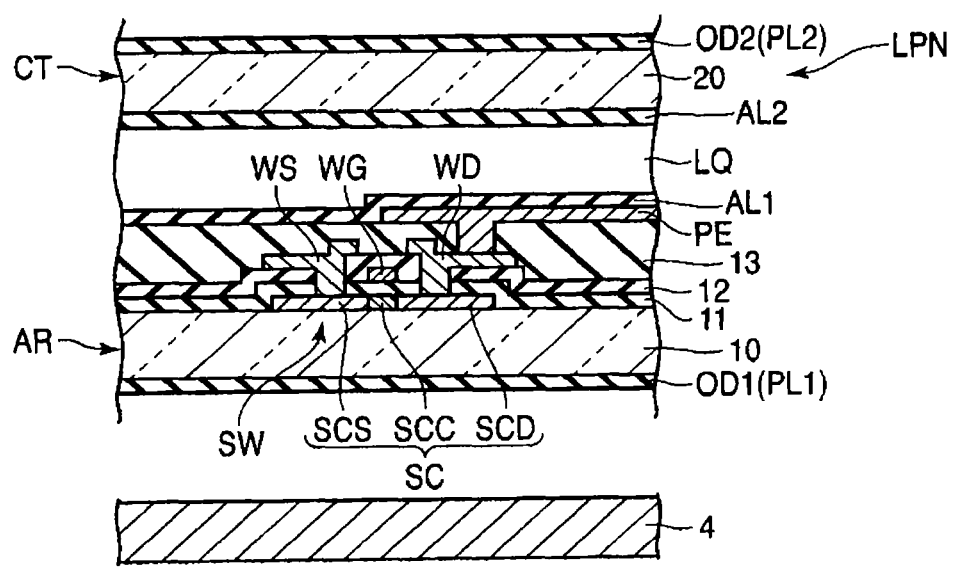
FIG. 4 is a cross-sectional view schematically showing the liquid crystal display panel including a switching element, etc.

FIG. 4 is a view schematically showing the cross-section of the liquid crystal display panel LPN including the switching element SW. In addition, only the portion required for explanation is illustrated here.

The backlight 4 is arranged at the back side of the array substrate AR which constitutes the liquid crystal display panel LPN.

The array substrate AR is formed using an insulating substrate 10 having a light transmissive characteristics, such as a glass substrate and a plastic substrate. This array substrate AR includes the switching element SW, the pixel electrode PE, a first alignment layer AL1, etc., on the side of the first insulating substrate 10 facing the counter substrate CT.

In the example shown here, the switching element SW may be either a top-gate type switching element or a bottom-gate type switching element, and includes a semiconductor layer formed of poly-silicon or amorphous silicon, though the detailed description thereof is not made.

A semiconductor layer SC has a source region SCS and a drain region SCD on both sides which face across a channel region SCC, respectively. In addition, an undercoat layer which is an insulating film may be arranged between the first insulating substrate 10 and the semiconductor layer SC. The semiconductor layer SC is covered with a gate insulating film 11. Moreover, the gate insulating film 11 is arranged also on the first insulating substrate 10.

A gate electrode WG is formed on the gate insulating film 11, and is located on the channel region SCC of the semiconductor layer SC. The gate line G and the auxiliary capacitance line C are also formed on the gate insulating film 11. The gate electrode WG, the gate line G and the auxiliary capacitance line C may be formed using the same material and the same process. The gate electrode WG is electrically connected with the gate line G.

The gate electrode WG of the switching element, the gate line and the auxiliary capacitance line C are covered with a first interlayer insulating film 12. Moreover, the first interlayer insulating film 12 is arranged also on the gate insulating film 11. The gate insulating layer and 11 and the first interlayer insulating film 12 are formed of an inorganic system material, such as silicon oxide and silicon nitride.

A source electrode WS and a drain electrode WD of the switching element SW are formed on the first interlayer insulating film 12. The source line (not shown) is also formed on the first interlayer insulating film 12. The source electrode WS, the drain electrode WD, and the source lines may be formed using the same process and the same material. The source electrode WS is electrically connected with the source line.

The source electrode WS is in contact with the source region SCS of the semiconductor layer SC through a contact hole which penetrates the gate insulating film 11 and the first interlayer insulating film 12. The drain electrode WD is in contact with the drain region SCD of the semiconductor layer SC through a contact hole which penetrates the gate insulating film 11 and the first interlayer insulating film 12. The gate electrodes WG, the gate lines, the auxiliary capacitance lines, the source electrode WS, the drain electrode WD, and source lines are formed of electric conductive materials, such as molybdenum, aluminum, tungsten, and titanium, for example.

The switching element SW as described above is covered with a second interlayer insulating film 13. That is, the source electrode WS, the drain electrode WD, and the source lines are covered with the second interlayer insulating film 13. Moreover, the second interlayer insulating film 13 is arranged also on the first interlayer insulating film 12. This second interlayer insulating film 13 is formed of various organic materials, such as ultraviolet curing type resin and heat curing type resin, for example.

The pixel electrode PE is formed on the second interlayer insulating film 13. Though not described in detail, the first main pixel electrode PA1 and the second main pixel electrode PA2 that constitute the pixel electrode PE are formed on the second interlayer insulating film 13. The pixel electrode PE is connected with the drain electrode WD through a contact hole which penetrates the second interlayer insulating film 13. Though the pixel electrode PE is formed by light transmissive conductive materials, such as Indium Tin Oxide (ITO), Indium Zinc Oxide (IZO), etc, other metals such as aluminum may be used.

The first alignment film AM is arranged on a surface of the array substrate AR facing the counter substrate CT, and extends approximately whole region of the active area ACT. The first alignment film AM covers the pixel electrode PE, and also formed on the second interlayer insulating film 13. The first alignment film AL1 is formed of the material which shows a lateral alignment characteristics.

On the other hand, the counter substrate CT is formed using a second transmissive insulating substrate 20, such as a glass substrate and a plastic substrate. The counter substrate CT includes the common electrode CE and a second alignment film AL2 on the surface of the second insulating substrate 20 facing the array substrate AR. A black matrix arranged facing wiring portions such as the source line S, the gate line G, the auxiliary capacitance line C, and the switching element SW to define the respective pixels PX, color filter layers arranged corresponding to the pixels PX, and an overcoat layer to smooth the concave and depression of the surface of a black matrix and the color filter layer may be formed on the counter substrate CT.

The common electrode CE includes the first main common electrode CA1, the second main common electrode CA2, and the third main common electrode CA3, and is formed on the second insulating substrate 20. The common electrode CE is formed of the electric conductive material which has light transmissive characteristics, such as ITO and IZO.

A second alignment film AL2 is arranged on a surface of the counter substrate CT opposing the surface of the array substrate AR, and extends approximately whole of the active area ACT. The second alignment film AL2 covers the common electrodes CE. The second alignment film AL2 is formed materials which have a lateral alignment characteristics An alignment processing (for example, rubbing processing and photo alignment processing) is performed for making the first and second alignment films AL1 and AL2 in an initial alignment state. The direction of the first alignment processing in which the first alignment film AM carries out the initial alignment of the liquid crystal molecule, and the direction of the second alignment processing in which the second alignment film AL2 carries out the initial alignment of the liquid crystal molecule, are respectively directions in parallel to the first direction Y. The first and second alignment directions are in parallel and in the same directions or reverse directions each other.

The array substrate AR and the counter substrate CT as mentioned-above are arranged so that the first alignment film AM and the second alignment film AL2 face each other. In this case, the pillar-shaped spacer is formed integrally with one of the substrates by resin material between the first alignment film AM on the array substrate AR and the second alignment film AL2 on the counter substrate CT. Thereby, a predetermined gap, for example, a 2-7 µm cell gap, is formed. The array substrate AR and the counter substrate CT are pasted together by the seal material which is not illustrated, in which the predetermined cell gap is formed.

The liquid crystal layer LQ is held at the cell gap formed between the array substrate AR and the counter substrate CT, and is arranged between the first alignment film AL1 and the second alignment film AL2. The liquid crystal layer LQ contains the liquid crystal molecule which is not illustrated. The liquid crystal layer LQ is constituted by positive type liquid crystal material.

A first optical element OD1 is attached to the external surface of the array substrate AR, i.e., the external surface of the first insulating substrate 10 which constitutes the array substrate AR by adhesives, etc. The first optical element OD1 contains a first polarizing plate PL1 which has a first polarization axis. Moreover, a second optical element OD2 is attached to the external surface of the counter substrate CT, i.e., the external surface of the second insulating substrate 20 which constitutes the counter substrate CT by adhesives, etc.

The second optical element OD2 contains a second polarizing plate PL2 which has a second polarization axis. The first polarization axis of the first polarizing plate PL1 and the second polarization axis of the second polarizing plate PL2 are arranged in a relationship in which they intersect perpendicularly, for example. One polarizing plate is arranged, for example, so that its polarizing direction is the direction of the long axis of the liquid crystal molecule, i.e., the first alignment processing direction or a parallel direction to the second alignment processing direction (or in parallel to the first direction Y), or in an orthogonal direction (or in parallel to the second direction X). Thereby, the normally black mode is achieved.

Namely, at the time of non-electric field state, i.e., when a potential difference (i.e., electric field) is not formed between the pixel electrode PE and the common electrode CE, the liquid crystal molecules LM of the liquid crystal layer LQ are aligned so that their long axis are aligned in a parallel direction with the first alignment direction of the first alignment film AL1 and the second alignment direction of the second alignment film AL2 as shown with a dashed line in FIG. 3. In this state, the time of OFF corresponds to the initial alignment state, and the alignment direction of the liquid crystal molecule LM corresponds to the initial alignment direction.

In addition, precisely, the liquid crystal molecules LM are not exclusively aligned in parallel with a X-Y plane, but are pre-tilted in many cases. For this reason, the precise direction of the initial alignment is a direction in which an orthogonal projection of the alignment direction of the liquid crystal molecule LM at the time of OFF is carried out to the X-Y plane. However, in order to explain simply hereinafter, the liquid crystal molecule LM is assumed that the liquid crystal molecule LM is aligned in parallel with a X-Y plane, and is explained as what rotates in a field in parallel with the X-Y plane.

Here, both of the first alignment processing direction of the first alignment film AL1 and the second alignment processing direction of the second alignment film AL2 are directions in parallel to the first direction Y or directions in parallel to the oblique direction D. At the time of OFF, the long axis of the liquid crystal molecule LM is aligned substantially in parallel to the first direction Y or the oblique direction D. That is, the direction of the initial alignment of the liquid crystal molecule LM is in parallel to the first direction Y or the oblique direction D. In the example shown in FIG. 3, the initial alignment direction of the liquid crystal molecule LM is in parallel to the first direction Y.

In addition, when both of the first and second alignment processing directions are in parallel, and are reverse directions each other, the liquid crystal molecule LM is aligned so that the liquid crystal molecule LM is aligned with an approximately uniform pre-tilt angle near the first and second alignment films AL1 and AL2 and in the intermediate portion of the liquid crystal layer LQ (homogeneous alignment). In addition, when the respective directions of the alignment processing of the first alignment film AL1 and the second alignment film AL2 are in parallel and the same directions each other, the liquid crystal molecule LM is aligned with approximately horizontal direction (i.e., the pre tilt angle is approximately zero) in a cross-section of the liquid crystal layer LQ. The liquid crystal molecule LM is aligned with the pre-tilt angle so that the alignment of the liquid crystal molecule LM near the first alignment film AL1 and the second alignment film AL2 becomes symmetrical with respect to the intermediate portion of the liquid crystal layer LQ (splay alignment).

A portion of the back light from the backlight 4 enters into the liquid crystal display panel LPN after penetrating the first polarizing plate PL1. The polarization state of the light which enters into the liquid crystal display panel LPN changes depending on the alignment state of the liquid crystal molecule LM when the light passes the liquid crystal layer LQ. At the time of OFF, the light which passes the liquid crystal layer LQ is absorbed by the second polarizing plate PL2 (black display).

On the other hand, in case where the potential difference is formed between the pixel electrode PE and the common electrode CE (at the time of ON), the lateral electric field in parallel to the substrate (or oblique electric field) is formed between the pixel electrode PE and the common electrode CE. Thereby, the liquid crystal molecule LM rotates within a parallel plane with the substrate surface so that the long axis becomes in parallel with the direction of the electric field as shown in a dashed line in FIG. 3.

In the example shown in FIG. 3, the liquid crystal molecule LM between the first main pixel electrode PA1 and the first main common electrode CA1 rotates counterclockwise with reference to the first direction Y, and is aligned so that the liquid crystal molecule LM may turn to the upper left direction along the electric field in the figure. The liquid crystal molecule LM between the first main electrode PA1 and the second common main electrode CA2 rotates clockwise with reference to the first direction Y, and is aligned so that the liquid crystal molecule LM may turn to the upper right direction along the electric field in the figure. The liquid crystal molecule LM between the second main electrode PA2 and the second common main electrode CA2 rotates counter clockwise with reference to the first direction Y, and is aligned so that the liquid crystal molecule LM may turn to the upper left direction along the electric field in the figure. The liquid crystal molecule LM between the second main electrode PA2 and the third common main electrode CA3 rotates clockwise with reference to the first direction Y, and is aligned so that the liquid crystal molecule LM may turn to the upper right direction along the electric field in the figure.

Thus, in each pixel PX, in case the lateral electric field or the oblique electric field is formed between the pixel electrode PE and the common electrode CE, the alignment direction of the liquid crystal molecule LM is divided into at least two groups of directions, and two domains are formed corresponding respective alignment directions. That is, at least two domains are formed in each pixel PX.

At the time of ON, the light which entered into the liquid crystal panel LPN from the backlight 4 enters into the liquid crystal layer LQ. When the back light which entered into the liquid crystal layer LQ passes through four domains (apertures) divided with the pixel electrode PE and the common electrode CE, respectively, the polarization state changes. At the time of ON, at least a portion of light which passed the liquid crystal layer LQ penetrates the second polarizing plate PL2 (white display).

According to this embodiment, it becomes possible to form at least two domains. Therefore, the viewing angle in at least two directions can be compensated optically, and a wide viewing angle is attained while becoming possible to suppress the generation of gradation reversal. Accordingly, it becomes possible to offer a high quality display device.

In addition, in case the first main common electrode CA1 and the third main common electrode CA3 are respectively arranged on the source line S1 and the source line S2, it becomes possible to make the apertures enlarge and raise the transmissivity of the pixel PX compare with the case where the first main common electrode CA1 and the third main common electrode CA3 are respectively arranged on the main pixel electrode side.

Furthermore, at the time of ON, since the lateral electric field is hardly formed (or sufficient electric field to drive the liquid crystal molecule LM is not formed) near the main pixel electrode PA of the pixel electrode PE and the main common electrode CA of the common electrode CE, the liquid crystal molecule LM hardly moves from the initial alignment direction like at the time of OFF. For this reason, as mentioned-above, even if the pixel electrode PE and the common electrode CE are formed of the electric conductive material with the light transmissive characteristics in these domains, the backlight hardly penetrates, i.e., hardly contributes to the display at the time of ON. Therefore, the pixel electrode PE and the common electrode CE do not necessarily need to be formed of a transparent electric conductive material, and may be formed using electric conductive materials, such as aluminum and silver.

By the way, in the structure in which the array substrate AR includes the main pixel electrode PA, and the counter substrate CT includes the main common electrode CA, since the main pixel electrode PA and the main common electrode CA are arranged by turns in substantially parallel, the inter-electrode distance between the main pixel electrode PA and the main common electrode CA differs from a designed value due to an assembling shift of the substrates in the process of attaching the array substrate AR and the counter substrate CT together. Since the electric field intensity between the main pixel electrode PA and the main common electrode CA differs according to the inter-electrode distance, even if the same voltage is impresses to the liquid crystal layer LQ, luminosity variation arises between the respective panels in which the inter-electrode distances differ.

If the inter-electrode distance (further, electrode width) is set up greatly enough to the amount of variation of the inter-electrode distance against the assembling shift, it is possible to reduce luminosity variation. Then, the assembling shift allowable limitation is set up, and an optimal value of the inter-electrode distance is also set up. Hereinafter, one view of deciding the optimal value of the inter-electrode distance is explained.

In the liquid crystal display device using a transmissive type liquid crystal display panel LPN, the transmissivity which contributes to the luminosity changes with the voltage impressed to the liquid crystal panel. In the normally black mode described above, as shown in FIG. 5, when the impressed voltage to the liquid crystal molecules is low, the transmissivity is low, and when the impressed voltage to the liquid crystal molecules is high, there is a tendency for transmissivity to become high. However, the impression of higher voltage beyond a certain voltage has tendency for transmissivity to fall conversely with increase in the liquid crystal impressing voltage. That is, a peak transmissivity exists in a light transmission characteristics. The liquid crystal impressing voltage by which such peak transmissivity is obtained is called a white display voltage, and the liquid crystal impressing voltage by which the transmissivity becomes the minimum is called a black display voltage.

In a state where the white display voltage is impressed, the director (or the direction of the long axis) of the liquid crystal molecule LM becomes a shifted state by approximately 45° to the first polarization axis (or absorption axis) of the first polarizing plate PL1 and the second polarization axis (or absorption axis) of the second polarizing plate PL2, and thereby the optical modulation rate of the liquid crystal molecules becomes the highest.

Figure 6:
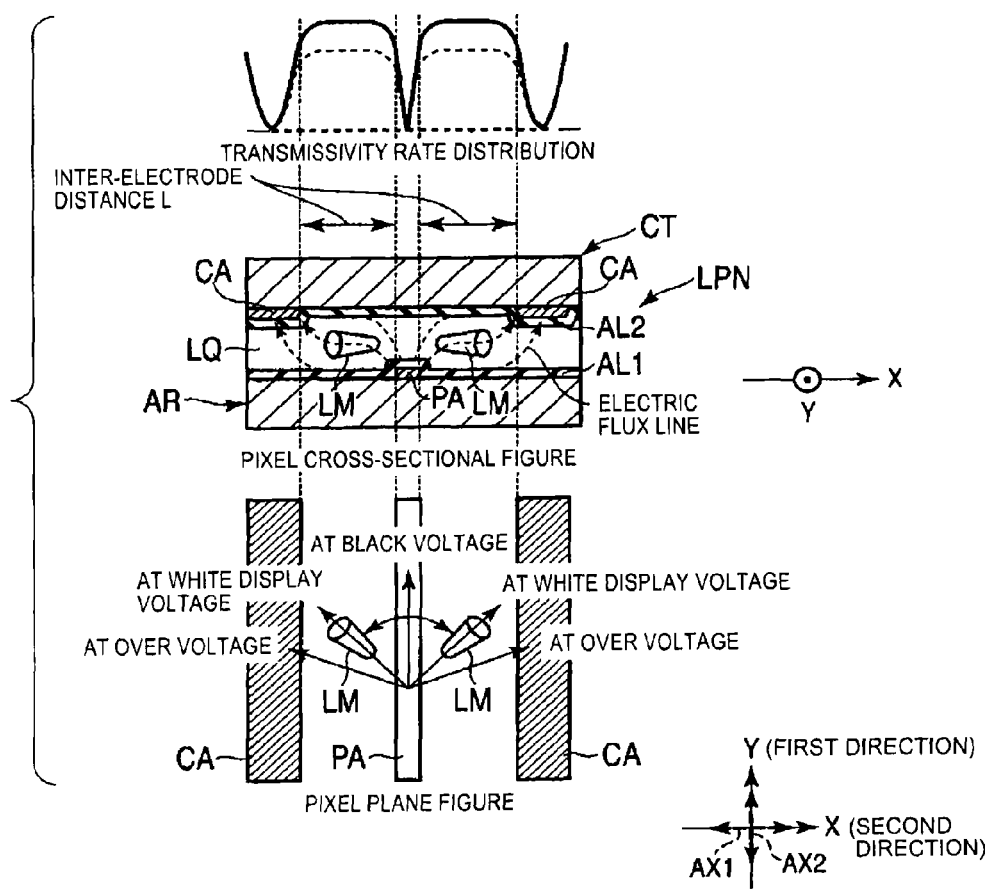
FIG. 6 is a figure showing the relation between a director of a liquid crystal molecule and transmissivity thereof by electric field between a pixel electrode and a common electrode.

For example, in the example shown in FIG. 6, the case where the direction of the initial alignment of the liquid crystal molecule LM is in parallel to the first direction Y, the first polarization axis AX1 is in parallel to the second direction X, and further, the second polarization axis AX2 is in parallel to the first direction Y is described. In case the black display voltage is impressed, the director of the liquid crystal molecule LM is in parallel to the first direction Y within the X-Y plane, and in parallel to a 90° to 270° direction. In case the white display voltage is impressed, the director of the liquid crystal molecule LM becomes in parallel to a direction of 45° to 225° or a direction of 135° to 315° within the X-Y plane, and peak transmissivity is obtained. However, even if the voltage lower or higher than white display voltage as liquid crystal impressing voltage is impressed, the angle formed between the director of the liquid crystal molecule LM and the first polarization axis AX1, and between the director of the liquid crystal molecule LM and the second polarization axis AX2 becomes 45° or less. Accordingly, the light modulation rate falls and the transmissivity also falls rather than the case where the white display voltage is impressed.

Figure 7:
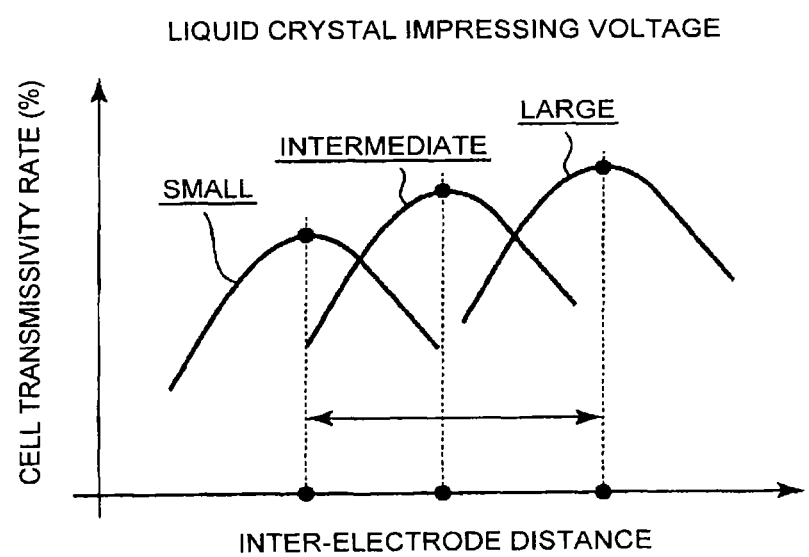
FIG. 7 is a figure showing the relation among inter-electrode distance, liquid crystal impressing voltage, and transmissivity of a cell.

Moreover, as shown in FIG. 7, the value of the white display voltage by which the peak transmissivity is obtained also changes with the size of the inter-electrode distance L. That is, in the inter-electrode distance L, when the inter-electrode distance L becomes large, the value of the white display voltage becomes high. On the contrast, when the inter-electrode distance L becomes small, the value of the white display voltage becomes low. That is, the transmissivity can be made higher with increase of the inter-electrode distance L, but the value of the white display voltage also tends to become higher.

Thus, it becomes advantageous to the luminosity variation due to the assembling shift if the inter-electrode distance L is set to larger, but the white display voltage becomes large. In the liquid crystal display device, restriction may be put on physical properties (dielectric anisotropy $\Delta \in$ and elastic constant k, etc.) or the maximum voltage value which can be used in the liquid crystal display device. Therefore, it is desirable to set up the inter-electrode distance L as an optimal inter-electrode distance Lop in the liquid crystal display panel LPN in which the peak transmissivity is obtained in a voltage range which can be used.

However, if the optimal inter-electrode distance Lop (further, electrode width) is fixed, it becomes difficult to correspond to the change of the pixel length (or pixel pitch) in the second direction X by the demand from the use for the liquid crystal display panel LPN and product. Especially, regarding the high resolution pixel in which the pixel length is comparatively small, when the main pixel electrode PA and the main common electrode CA cannot be arranged by the optimal inter-electrode distance Lop, and the inter-electrode distance L and the electrode width are reduced according to the pixel length, not only the reduce in transmissivity is resulted, but the change rate of the inter-electrode distance L due to the assembling shift becomes large, which is also disadvantageous for the luminosity variation.

Then, in this embodiment, among the first inter-electrode distance L1, the second inter-electrode distance L2, the third inter-electrode distance L3, and the fourth inter-electrode distance L4, one of the four inter-electrode distances is set to an optimal inter-electrode distance Lop and one of the four inter-electrode distances is different from at least one of the other three inter-electrode distances.

At this time, the area of the domain set up by the optimal inter-electrode distance Lop in one pixel is set up much more than the other domains in which the inter-electrode distance L is set up smaller than the optimal inter-electrode distance Lop.

Thereby, in the area set up by the optimal inter-electrode distance Lop as described above, the margin to the assembling shift is large, and it is possible to control luminosity variation. On the other hand, in the area in which the inter-electrode distance L is set smaller than the optimal inter-electrode distance Lop, since the margin to the assembling shift is small when the assembling shift arises, the luminosity variation is generated. However, since the area ratio of the above smaller area to the whole pixel area is small, the degree of influence to the luminosity becomes small, and it becomes possible to control the luminosity variation due to the assembling shift to the minimum.

In the embodiment, the optimal inter-electrode distance Lop is defined as follows. In a range of voltage which is applied between the main pixel electrodes and the main common electrodes, more than 90% of a peak transmissivity is obtained by the optimal inter-electrode distance Lop.

Figure 8:
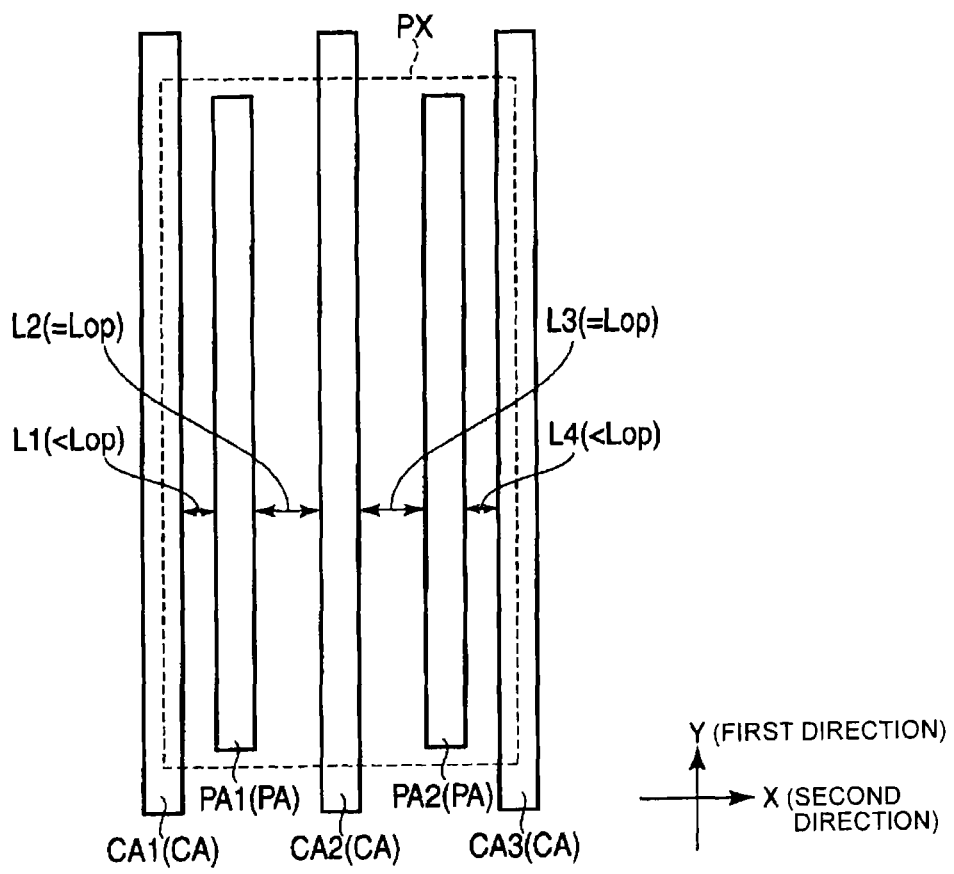
FIG. 8 is a plan view schematically showing a structure of the pixel in the liquid crystal display panel when the pixel is seen from a normal line of the liquid crystal display panel according to a first embodiment.

FIG. 8 is a plan view schematically showing the structure of the pixel in the liquid crystal display panel when the pixel is seen from a normal line according to a first embodiment.

In one pixel PX, the first main common electrode CA1, the first main pixel electrode PA1, the second main common electrode CA2, the second main pixel electrode PA2, and the third main common electrode CA3 are arranged along with this order in the second direction X. In this embodiment, two inter-electrode distances among the first inter-electrode distance L1, the second inter-electrode distance L2, the third inter-electrode distance L3, and the fourth inter-electrode distance L4 are approximately the same and larger than the other two inter-electrode distances.

In this embodiment, the second inter-electrode distance L2 and the third inter-electrode distance L3 are substantially same and larger than the first inter-electrode distance L1 and the fourth inter-electrode distance L4. Moreover, the first inter-electrode distance L1 and the fourth inter-electrode distance L4 are substantially same. At this time, the second inter-electrode distance L2 and the third inter-electrode distance L3 are set as the optimal inter-electrode distance Lop, and the first inter-electrode distance L1 and the 4th inter-electrode distance L4 are set up smaller than the optimal inter-electrode distance Lop. That is, in one PX, the inter-electrode distance is set to the optimal inter-electrode distance Lop in two domains of the central portion of the pixel, and the inter-electrode distance is set smaller than the optimal inter-electrode distance Lop in each domain of the both ends of the pixel. As an example, the second inter-electrode distance L2 and the third inter-electrode distance L3 which are the optimal inter-electrode distance Lop are 7.0 µm, respectively and the first inter-electrode distance L1 and the fourth inter-electrode distance L4 are 4.0 µm, respectively.

In addition, in the example of the first embodiment shown here, although the widths of the main pixel electrodes PA and the main common electrode CA are the same, they may be different each other. Moreover, the inter-electrode distance may be set smaller than the optimal inter-electrode distance Lop in the central side of the pixel, and may be set to the optimal inter-electrode distance Lop in each domain of both ends of the pixel. Moreover, the domain set to the optimal inter-electrode distance Lop and the domain set to inter-electrode distance smaller than the optimal inter-electrode distance Lop may be located in a line by turns along the second direction X.

Figure 9:
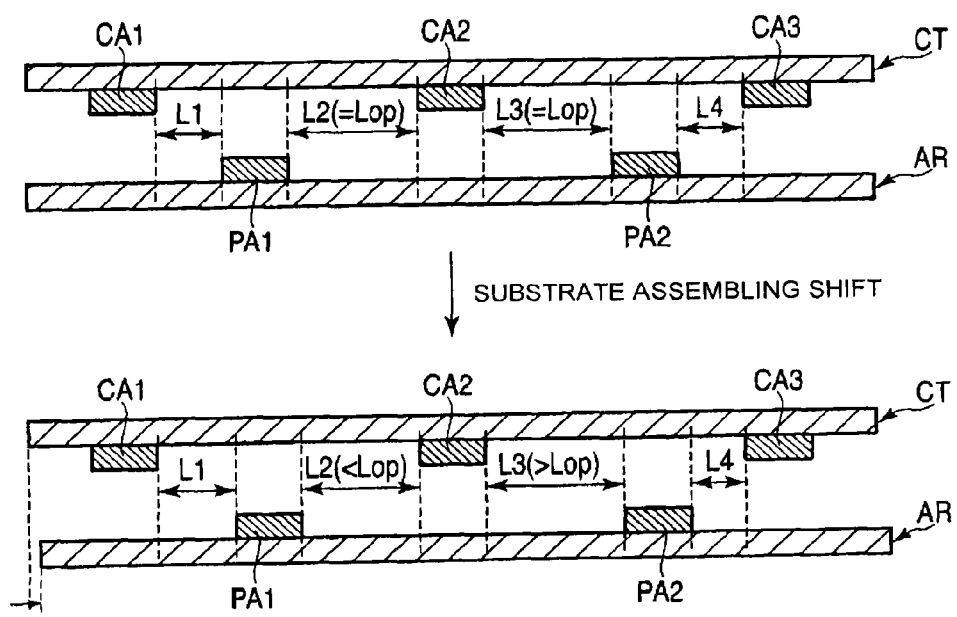
FIG. 9 is a cross-sectional view schematically showing the liquid crystal display panel according to the first embodiment shown in FIG. 8, and an example of a substrate assembling shift.

FIG. 9 is a schematic sectional view of the liquid crystal display panel LPN according to the first embodiment shown in FIG. 8, and is a figure showing an example of the assembling shift.

The upper portion in the figure shows a state where the array substrate AR and the counter substrate CT are attached together without producing the assembling shift. The second inter-electrode distance L2 between the first main pixel electrode PA1 and the second main common electrode CA2, and the third inter-electrode distance L3 between the second main common electrode CA2 and the second pixel electrode PA2 are set to the optimal inter-electrode distance Lop. The second inter-electrode distance L1 between the first main pixel electrode PA1 and the first main common electrode CA1, and the fourth inter-electrode distance L4 between the second pixel electrode PA2 and the third main common electrode CA3 are set substantially equal and are set to smaller than the optimal inter-electrode distance Lop.

The bottom in the figure shows a state where the assembling shift between the array substrate AR and the counter substrate CT is produced. In the example shown here, the array substrate AR is shifted to the right-hand side in the figure. At this time, as compared with the left-hand side in the figure, the first inter-electrode distance L1 and the third inter-electrode distance L3 are expanded, and the second inter-electrode distance L2 and the fourth inter-electrode distance L4 are reduced.

Figure 5:
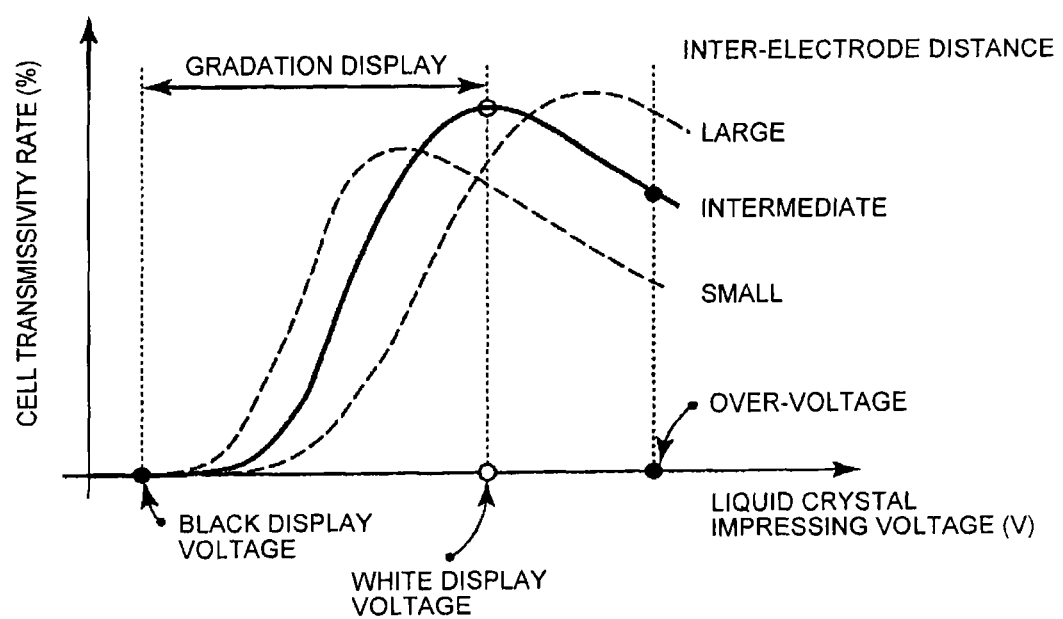
FIG. 5 is a figure showing an example of the transmissivity characteristic of the liquid crystal display device.

In the region between the first main pixel electrode PA1 and the second main common electrode CA2, and the region between the second main pixel electrode PA2 and the second main common electrode CA2, even if the regions expand or reduce from the optimal inter-electrode distance Lop as explained, the change of the transmissivity according to the change of the inter-electrode distances due to the assembling shift between the first substrate and the second substrate is very small with reference to FIG. 5. On the contrast, in the region between the first main pixel electrode PA1 and the first main common electrode CA1, and the region between the second main pixel electrode PA2 and the third main common electrode CA3, each inter-electrode distance is set to smaller than the optimal inter-electrode distance Lop. Accordingly, when the inter-electrode distance changes due to the assembling shift, the change of the transmissivity according to the amount of inter-electrode distance change is large.

In one PX, the region between the first main pixel electrode PA1 the second main common electrode CA2, and the region between the second main pixel electrode PA2 and the second main common electrode CA2 mainly contribute to the display. On the contrast, the contributing rate to the display in the region between the first main pixel electrode PA1 and the first main common electrode CA1, and the region between the second main pixel electrode PA2 and the third main common electrode CA3 is very small. Accordingly, it becomes possible to control the change of the transmissivity per one pixel due to the assembling shift, i.e., the luminosity variation, irrespective of the pixel length. Thereby, based on the specification, etc., which are required to the liquid crystal display panel LPN, it becomes possible to correspond to the change of the pixel length suitably without degrading display grace.

Figure 10:
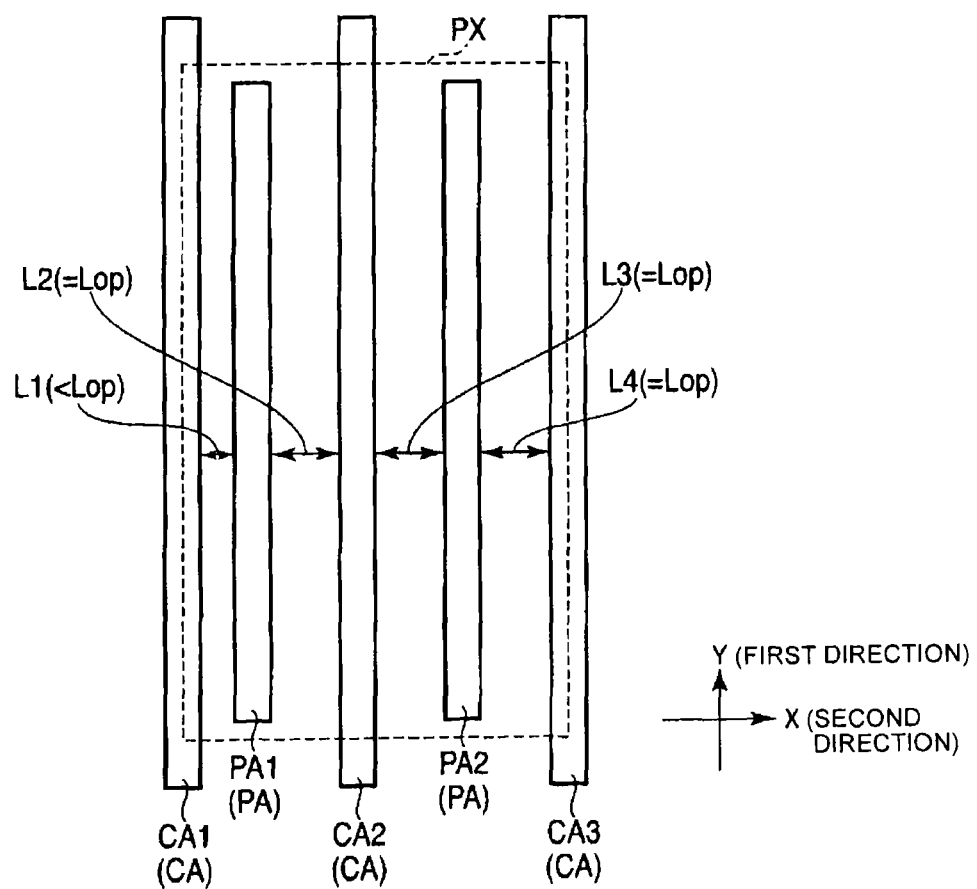
FIG. 10 is a plan view schematically showing the structure of the pixel in the liquid crystal display panel when the pixel is seen from a normal line of the liquid crystal display panel according to a second embodiment.

FIG. 10 is a plan view schematically showing a structure of the pixel in the liquid crystal display panel when the pixel is seen from a normal line according to a second embodiment.

In this embodiment, three inter-electrode distances among the first inter-electrode distance L1, the second inter-electrode distance L2, the third inter-electrode distance L3, and the fourth inter-electrode distance L4 are substantially equal and larger than the other one.

In this embodiment, the second inter-electrode distance L2, the third inter-electrode distance L3, and the forth inter-electrode distance L4 are substantially equal and larger than the first inter-electrode distance L1. At this time, the second inter-electrode distance L2, the third inter-electrode distance L3, and the fourth inter-electrode distance L4 are set to the optimal inter-electrode distance Lop, and the first inter-electrode distance L1 is set to smaller than the optimal inter-electrode distance Lop. That is, in one PX, the region at the left end of the pixel is set to an inter-electrode distance smaller than the optimal inter-electrode distance Lop, and in other three domains, the inter-electrode distances are set to the optimal inter-electrode distance Lop. As an example, the second inter-electrode distance L2, the third inter-electrode distance L3, and the fourth inter-electrode distance L4 which are the optimal inter-electrode distances Lop are 7.0 μm, and the first inter-electrode distance L1 is 2.0 μm, respectively.

Figure 11:
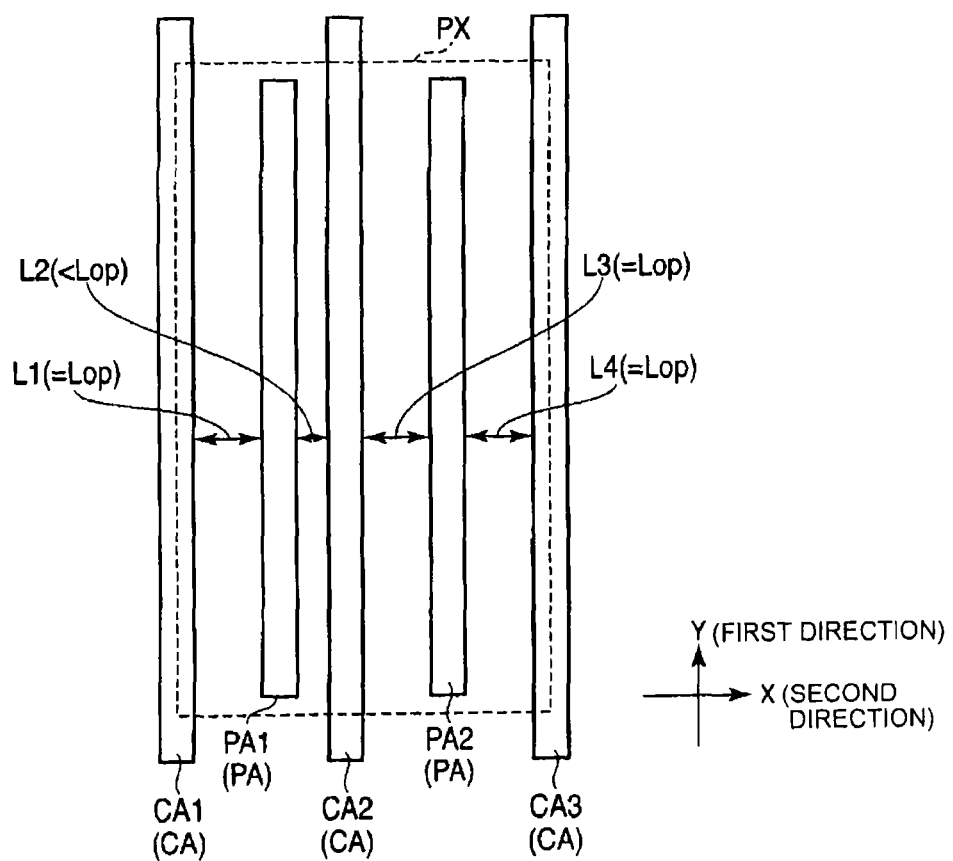
FIG. 11 is a plan view schematically showing the structure of the pixel in the liquid crystal display panel when the pixel is seen from a normal line of the liquid crystal display panel according to a third embodiment.

Also in the second embodiment, the same effect as the first embodiment is acquired FIG. 11 is a plan view schematically showing a structure of the pixel in the liquid crystal display panel when the pixel is seen from a normal line according to a third embodiment.

In this embodiment, three inter-electrode distances among the first inter-electrode distance L1, the second inter-electrode distance L2, the third inter-electrode distance L3, and the fourth inter-electrode distance L4 are substantially equal and larger than the other one inter-electrode distance as well as the second embodiment.

In this embodiment, the first inter-electrode distance L1, the third inter-electrode distance L3, and the forth inter-electrode distance L4 are substantially equal and larger than the second inter-electrode distance L2. At this time, the first inter-electrode distance L1, the third inter-electrode distance L3, and the fourth inter-electrode distance L4 are set to the optimal inter-electrode distance Lop, and the second inter-electrode distance L2 is set to smaller than the optimal inter-electrode distance Lop. That is, in one region in the central portion of the pixel, the inter-electrode distance is set to smaller than the optimal inter-electrode distance Lop, and in other three regions, the inter-electrode distances are set to the optimal inter-electrode distance Lop in one PX.

Also in the third embodiment, the same effect as the first embodiment is acquired.

Figure 12:
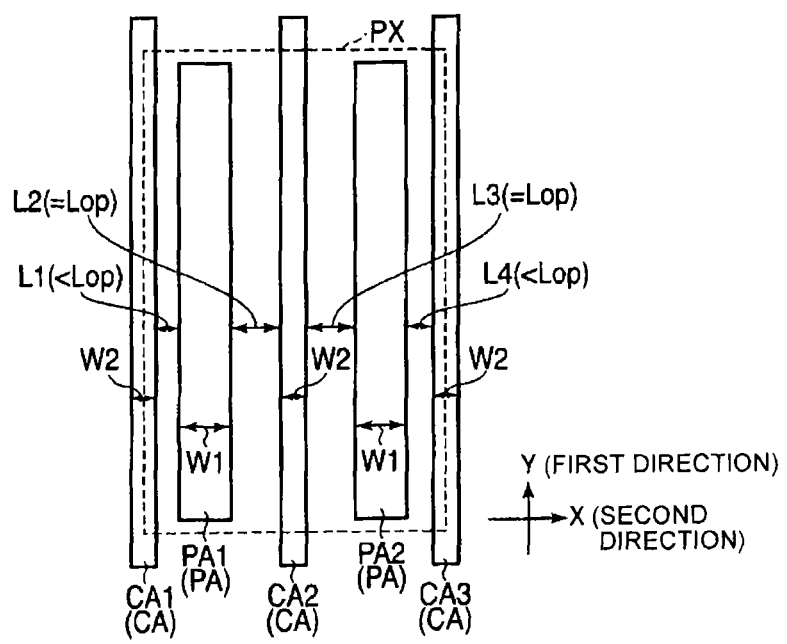
FIG. 12 is a plan view schematically showing the structure of the pixel in the liquid crystal display panel when the pixel is seen from a normal line of the liquid crystal display panel according to a fourth embodiment.

FIG. 12 is a plan view schematically showing a structure of the pixel in the liquid crystal display panel when the pixel is seen from a normal line according to a fourth embodiment.

In this embodiment, the respective widths W1 of the first main pixel electrode PA1 and the second main pixel electrode PA2 differ from the widths W2 of the first main common electrode CA1, the second main common electrode CA2, and the third main common electrode CA3. In addition, although the first inter-electrode distance L1, the second inter-electrode distance L2, the third inter-electrode distance L3, and the fourth inter-electrode distance L4 are set up like the first embodiment, the inter electrode distances may be set up like the second embodiment, or the third embodiment.

In this embodiment, the widths W1 of the first main pixel electrode PA1 and the second main pixel electrode PA2 are larger than the widths W2 of the first main common electrode CA1, the second main common electrode CA2 and the third main common electrode CA3. As an example, the widths W1 of the first main pixel electrode PA1 and the second main pixel electrode PM are 5 μm, respectively, and the width W2 of the first main common electrode CA1, the second main common electrode CA2 and the third main common electrode CA3 are 2 μm, respectively.

Figure 13:
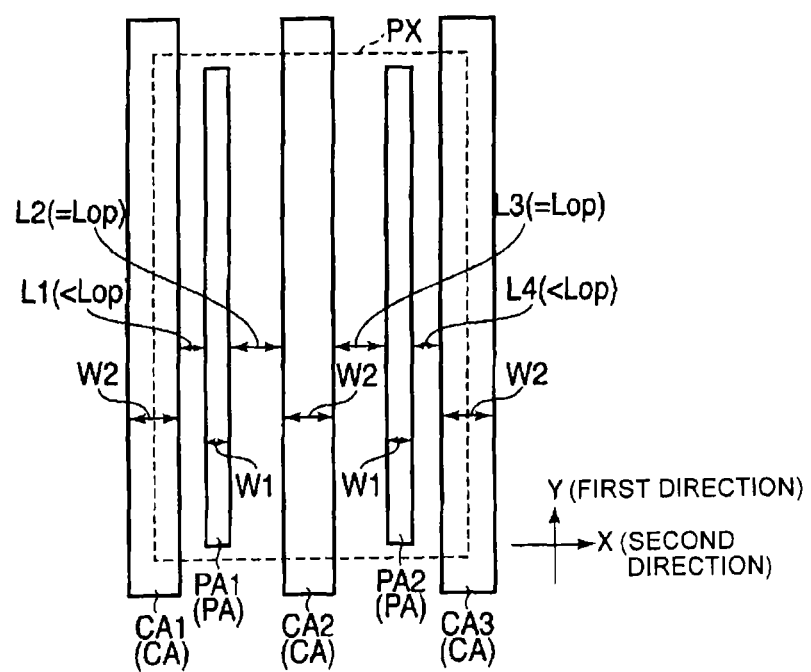
FIG. 13 is a plan view schematically showing other structure of the pixel in the liquid crystal display panel when the pixel is seen from a normal line of the liquid crystal display panel according to the fourth embodiment.

FIG. 13 is a plan view schematically showing other structure of the pixel in the liquid crystal display panel when the pixel is seen from a normal line according to a fourth embodiment.

In the illustrated embodiment, the widths W1 of the first main pixel electrode PA1 and the second main pixel electrode PM are 2 μm, respectively, and the widths W2 of first main common electrode CA1, the second main common electrode CA2 and the third main common electrode CA3 are 5 μm, respectively.

Also in the fourth embodiment shown in FIG. 12 and FIG. 13, the same effect as the first embodiment is acquired.

Figure 14:
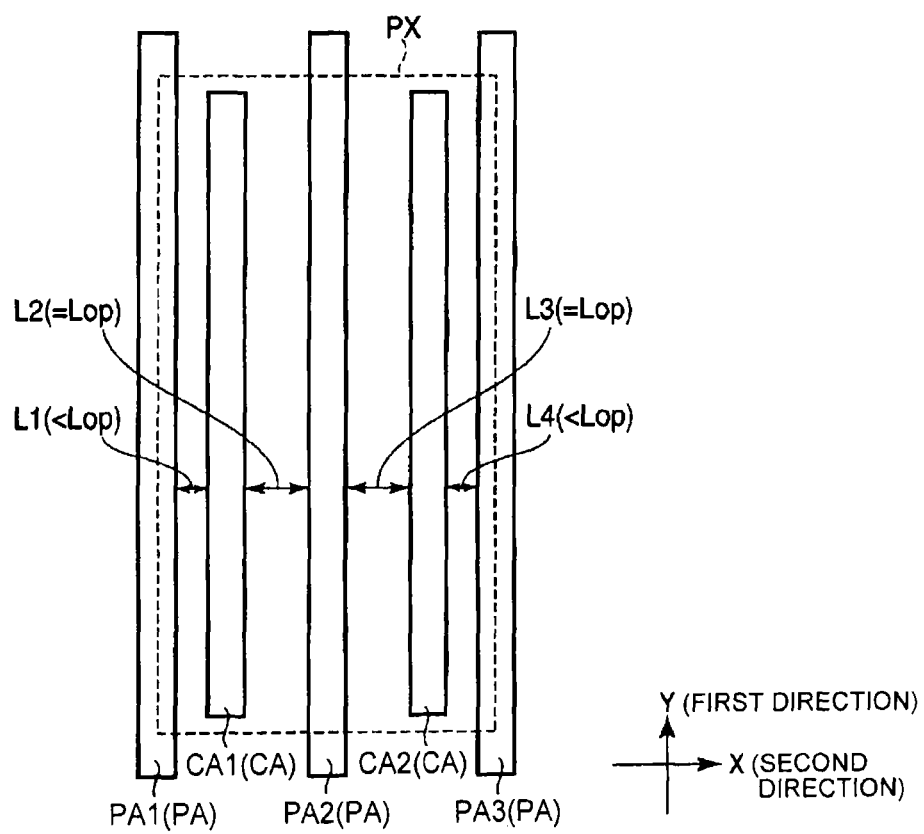
FIG. 14 is a plan view schematically showing a modification of the pixel in the liquid crystal display panel when the pixel is seen from a normal line of the liquid crystal display panel according to the first embodiment.
Figure 15:
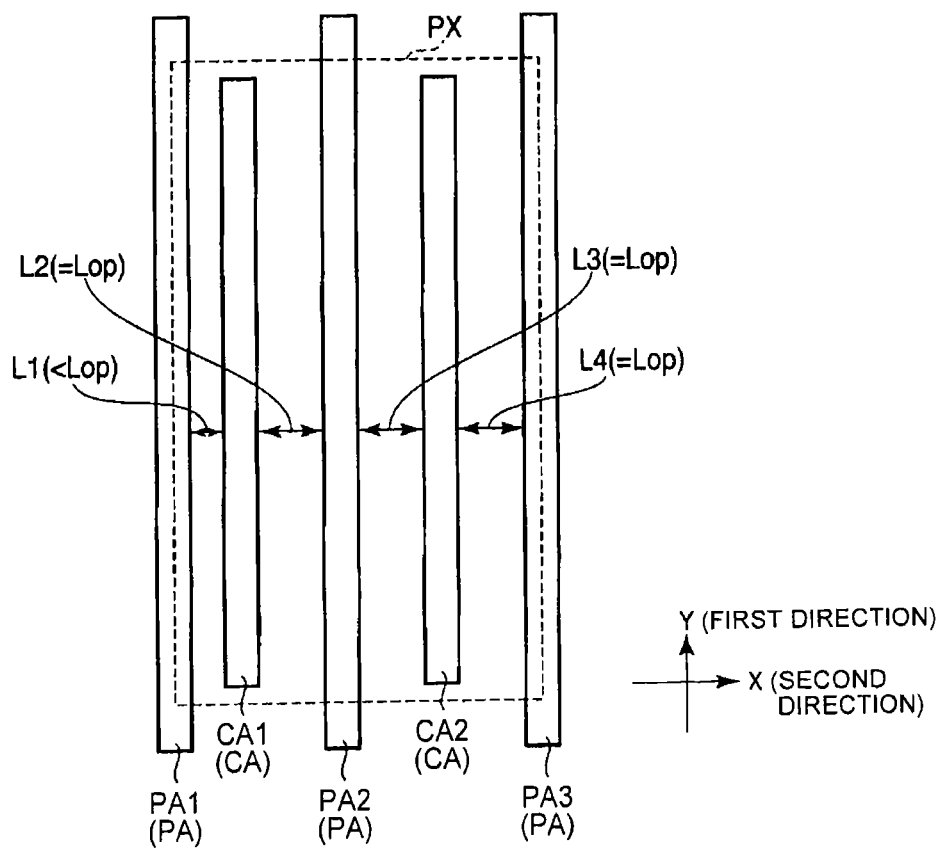
FIG. 15 is a plan view schematically showing a modification of the pixel in the liquid crystal display panel when the pixel is seen from a normal line of the liquid crystal display panel according to the second embodiment.
Figure 16:
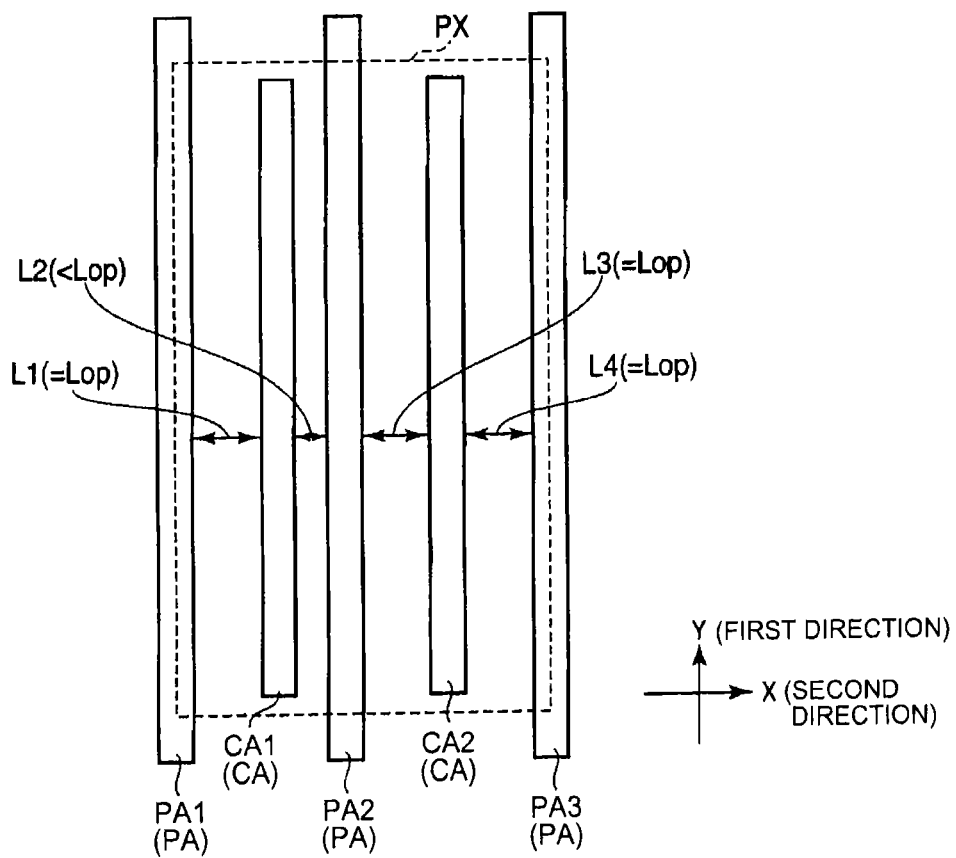
FIG. 16 is a plan view schematically showing a modification of the pixel in the liquid crystal display panel when the pixel is seen from a normal line of the liquid crystal display panel according to the third embodiment.

FIG. 14, FIG. 15 and FIG. 16 are plan views schematically showing respective modifications of the pixel in the liquid crystal display panel when the pixel is seen from a normal line of the liquid crystal display panel according to the first, second and third embodiments.

In the first to third embodiments, two main pixel electrodes and three main common electrodes are used. However, in the modifications, three main pixel electrodes and two main common electrodes are used. That is, three main pixel electrodes PA1, PA2 and PA3 and two main common electrodes CA1 and CA2 are used by replacing the main pixel electrodes with the main common electrodes in FIG. 8, FIG. 10, and FIG. 11. In the modifications, same effects as the first to third embodiments can be obtained. Detailed explanation will be omitted.

Next, the effect according to above embodiments was verified.

Herein, a simulation of the luminosity variation was carried out when the assembling shift was produced in a structure in which the first inter-electrode distance L1, the second inter-electrode distance L2, the third inter-electrode distance L3, and the fourth inter-electrode distance L4 were set up equally and smaller than the optimal inter-electrode distance Lop as a comparative example. On the other hand, it was checked that the luminosity variation rate in the first embodiment was decreased by 30% compare to the comparative example when the simulation of the luminosity variation was carried out in case the assembling shift of the same conditions was produced. Moreover, it was checked that luminosity variation rate was decreased by 15% compare to the comparative example when the simulation of the luminosity variation was carried out in case the assembling shift of the same conditions was produced.

As explained above, according to the embodiments, it becomes possible to offer a high quality liquid crystal display device.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A liquid crystal display device including a plurality of pixels arranged in a matrix, comprising:
   a first substrate including:
      a first main pixel electrode and a second main pixel electrode electrically connected to each other and extending along a first direction, respectively, and
      a first alignment film covering the first and second main pixel electrodes;

a second substrate including:
   a first main common electrode extending along one end of the pixel, a second main common electrode extending along another end of the pixel, and a third main common electrode arranged between the first main common electrode and the second main common electrode and electrically connected to each other and extending along the first direction, respectively, and the first main pixel electrode being arranged between the first main common electrode and the third main common electrode so as to obliquely face the first and third main common electrodes, and the second main pixel electrode being arranged between the second main common electrode and the third main common electrode so as to obliquely face the second and third main common electrodes, wherein the first main pixel electrode is arranged closer to the first main common electrode than the third main common electrode, and the second main pixel electrode is arranged closer to the second main common electrode than the third main common electrode, and
   a second alignment film covering the first, second, and third main common electrodes;
a liquid crystal layer having liquid crystal molecules and held between the first substrate and the second substrate;
wherein a first distance between the first main common electrode and the third main common electrode is substantially the same as a second distance between the second main common electrode and the third main common electrode, and a third distance between the first main pixel electrode and the second main pixel electrode is larger than the first and second distances, and
wherein a first alignment treatment direction performed to the first alignment film to initially align the liquid crystal molecules is substantially in parallel with and a same direction to a second alignment treatment direction performed to the second alignment film to initially align the liquid crystal molecules.

2. The liquid crystal display device according to claim 1, wherein the widths of the respective first and second main pixel electrodes are different from the respective widths of the first, second, and third main common electrodes.

3. A liquid crystal display device, comprising:
a first substrate including:
   a first electrode and a second electrode electrically connected to each other and extending along a first direction, respectively, and
   a first alignment film covering the first and second electrodes;
a second substrate including:
   a third electrode extending along one end of the pixel, a fourth electrode extending along another end of the pixel, and a fifth electrode arranged between the third electrode and the fourth electrode and electrically connected to each other and extending along the first direction, respectively, and the first electrode being arranged between the third electrode and the fourth electrode so as to obliquely face the third and fourth electrodes, and the second electrode being arranged between the fourth electrode and the fifth electrode so as to obliquely face the fourth and fifth electrodes, wherein the first electrode is arranged closer to the third electrode than the fifth electrode, and the second electrode is arranged closer to the fourth electrode than the fifth electrode, and
   a second alignment film, covering the third, fourth, and fifth electrodes;
a liquid crystal layer having liquid crystal molecules and held between the first substrate and the second substrate;
wherein a first distance between the third electrode and the fourth electrode is substantially the same as a second distance between the fourth electrode and the fifth electrode, and a third distance between the first electrode and the second electrode is larger than the first and second distances, and
wherein a first alignment treatment direction performed to the first alignment film to initially align the liquid crystal molecules is substantially in parallel with and a same direction to a second alignment treatment direction performed to the second alignment film to initially align the liquid crystal molecules.

4. The liquid crystal display device according to claim 3, wherein the widths of the respective first and second electrodes are different from the respective widths of the third, fourth, and fifth electrodes.

* * * * *